United States Patent
Gao et al.

(10) Patent No.: US 9,280,463 B2
(45) Date of Patent: Mar. 8, 2016

(54) SEMICONDUCTOR MEMORY GARBAGE COLLECTION

(71) Applicant: GLOBALFOUNDRIES U.S. 2 LLC COMPANY, Malta, NY (US)

(72) Inventors: Xue Dong Gao, Shanghai (CN); Min Long, Shanghai (CN); Karl A. Nielsen, Tucson, AZ (US); Hai Bo Qian, Shanghai (CN); Jeffrey R. Steffan, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 280 days.

(21) Appl. No.: 13/951,207

(22) Filed: Jul. 25, 2013

(65) Prior Publication Data
US 2015/0032939 A1   Jan. 29, 2015

(51) Int. Cl.
*G06F 12/02*   (2006.01)

(52) U.S. Cl.
CPC ........ *G06F 12/0253* (2013.01); *G06F 12/0246* (2013.01); *G06F 2212/2022* (2013.01)

(58) Field of Classification Search
CPC ............ G06F 12/0276; G06F 12/0253; G06F 12/026; G06F 11/3485; G06F 2009/45583; G06F 2201/88; G06F 2212/7205; G06F 3/0652; G06F 2212/702; G06F 12/0246; G06F 12/023; G06F 3/0608; G06F 2212/2022
See application file for complete search history.

(56) References Cited

U.S. PATENT DOCUMENTS

| | | |
|---|---|---|
| 8,209,503 B1 | 6/2012 | Smith |
| 8,364,918 B1 | 1/2013 | Smith |
| 8,386,700 B2 | 2/2013 | Olbrich et al. |
| 2007/0162526 A1* | 7/2007 | Printezis et al. ............. 707/206 |
| 2008/0082728 A1* | 4/2008 | Traister et al. ............... 711/103 |
| 2010/0287217 A1 | 11/2010 | Borchers et al. |
| 2010/0325351 A1 | 12/2010 | Bennett |
| 2012/0036309 A1* | 2/2012 | Dillow et al. ................. 711/103 |
| 2012/0066447 A1 | 3/2012 | Colgrove et al. |
| 2012/0072639 A1 | 3/2012 | Goss et al. |
| 2013/0185487 A1* | 7/2013 | Kim et al. ..................... 711/103 |
| 2014/0173176 A1* | 6/2014 | Kang ............................ 711/103 |

OTHER PUBLICATIONS

Youngjae Kim et al., "Harmonia: A Globally Coordinated Garbage Collector for Arrays of Solid-state Drives", 2011 IEEE 27th Symposium on Mass Storage Systems and Technologies (MSST), 2011, pp. 1-12.
Werner Bux et al., "Scheduling in Flash-Based Solid-State Drives-Performance Modeling and Optimization," 2012 IEEE 20th International Symposium on Modeling, Analysis & Simulation of Computer and Telecommunication Systems (MASCOTS), 2012, pp. 459-468.

* cited by examiner

*Primary Examiner* — Hashem Farrokh
(74) *Attorney, Agent, or Firm* — David Cain Hoffman Warnick LLC

(57) ABSTRACT

For semiconductor memory garbage collection, an identification module identifies a garbage collection time window for at least one block of a flash memory array. A garbage collection module garbage collects a first block of the flash memory array with a highest garbage collection level and an open garbage collection time window.

14 Claims, 13 Drawing Sheets

SEMICONDUCTOR MEMORY GARBAGE COLLECTION

FIELD

The subject matter disclosed herein relates to garbage collection and more particularly relates to semiconductor memory garbage collection.

BACKGROUND

Description of the Related Art

Semiconductor memories are typically written and read at a page level. However, data is erased at a block level, complicating garbage collection.

BRIEF SUMMARY

An apparatus for semiconductor memory garbage collection is disclosed. The apparatus includes an identification module and a garbage collection module. The identification module identifies a garbage collection time window for at least one block of a flash memory array. The garbage collection module garbage collects a first block of the flash memory array with a highest garbage collection level and an open garbage collection time window. A method and a computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
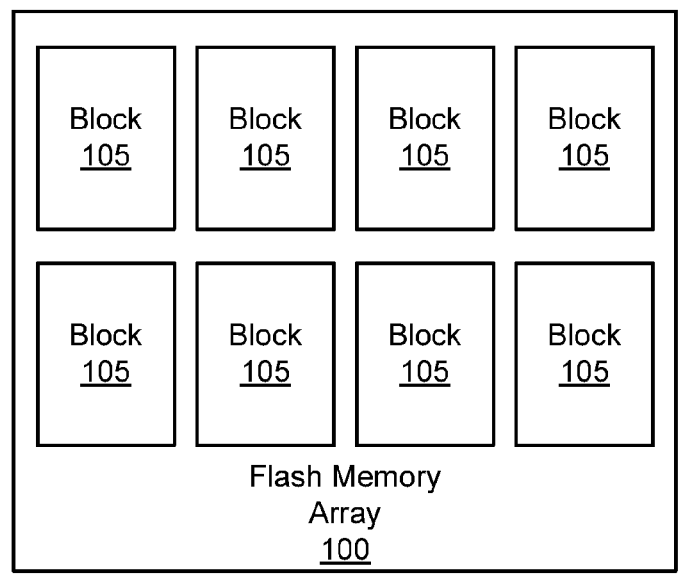
FIG. 1 is a schematic block diagram illustrating one embodiment of a flash memory array.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a flash memory array 100. The array 100 may be a Negated AND or NOT AND (NAND) Flash memory array 100. The array 100 is depicted with eight blocks 105. One of skill in the art will recognize that the embodiments may be practiced with any number of blocks 105.

Figure 2:
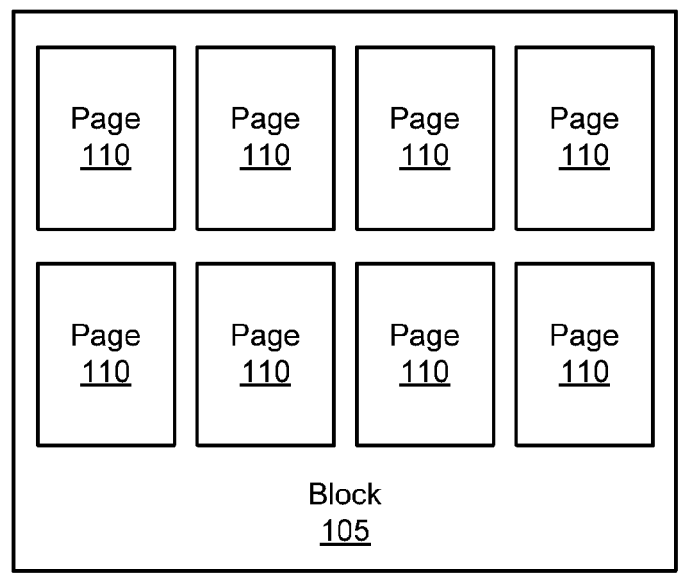
FIG. 2 is a schematic block diagram illustrating one embodiment of a block.

FIG. 2 is a schematic block diagram illustrating one embodiment of a block 105. The block 105 may be a block 105 from FIG. 1. The block 105 includes a plurality of pages 110. For simplicity, the block 105 is depicted with eight pages 110, but any number of pages 110 may be employed in the block 105. Each page 110 includes a plurality of memory spaces. Data may be written to the memory spaces. In addition, the data may later be read from the memory spaces. A catalog may track the physical location of the memory spaces storing the data.

Data may be written to a page 110 by writing to all memory spaces on the page 110. As a result, when a portion of the data on the page 110 is modified, the modified data is written to a new page 110 as will be illustrated hereafter. However, when data is erased, all pages 110 in a block 105 are erased concurrently. As a result, garbage collection methods used for other storage devices are not efficient or even practical for the array 100.

The embodiments described herein determine garbage collection levels and garbage collection time windows for blocks 105. The embodiments further select blocks 105 and perform garbage collection within the garbage collection time window to efficiently perform garbage collection for the array 100 as will be described hereafter.

Figure 3:
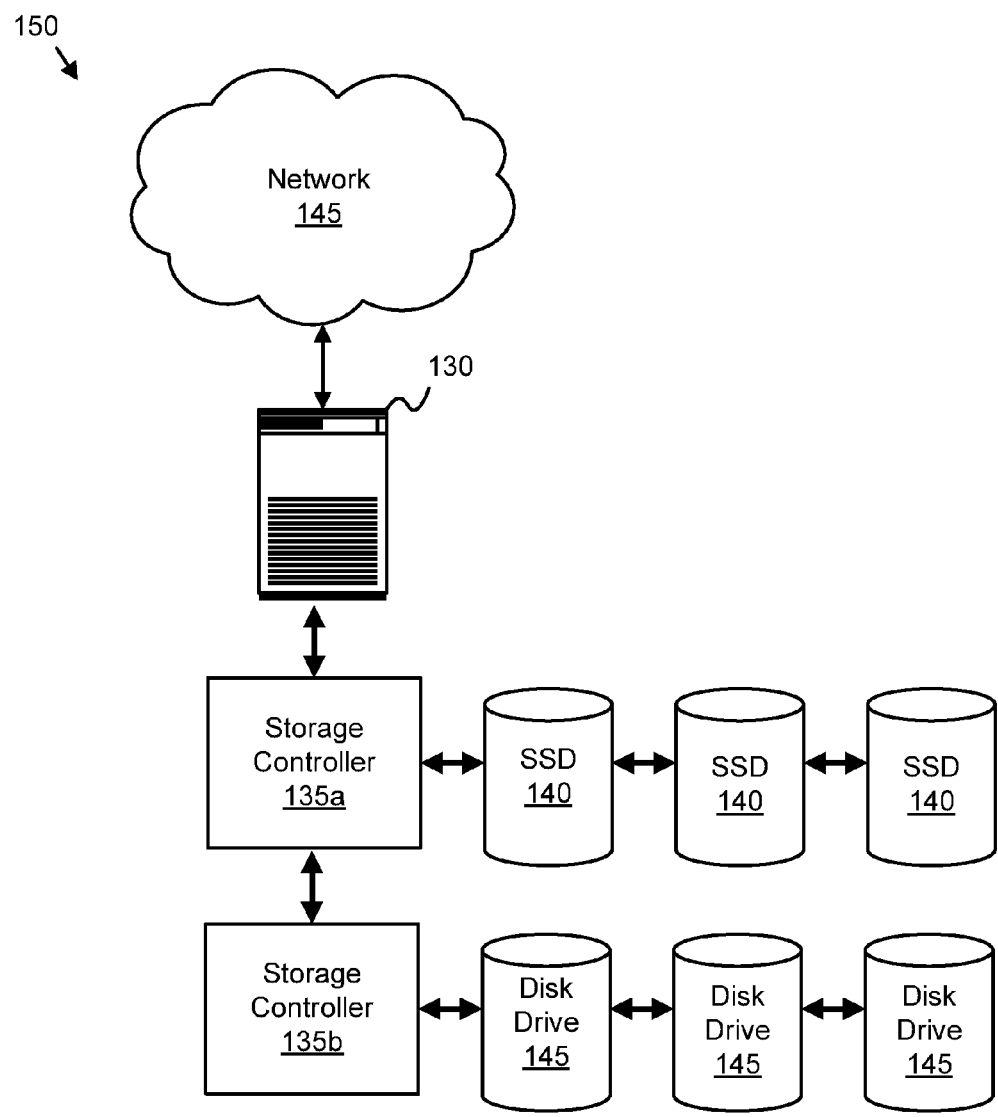
FIG. 3 is a schematic block diagram illustrating one embodiment of a storage system.

FIG. 3 is a schematic block diagram illustrating one embodiment of a storage system 150. The system 150 may store data at a data center. The system 150 includes a network 145, at least one server 130, one or more storage controllers 135, one or more solid-state drives (SSD) 140, and one or more disk drives 145. The SSD 140 may include a plurality of flash memory arrays 100 organized as a storage device. The disk drives 145 may include hard disk drives.

The network 145 may communicate requests to read data and/or write data to the server 130. The server 130 may communicate the requests to the storage controllers 135. The storage controllers 135 may read the data from and/or write the data to the SSD 140 and/or the disk drives 145. In one embodiment, data requiring a low latency may be stored in the SSD 140 while data that can tolerate a higher latency may be stored in the disk drives 145.

FIGS. 4A-D are schematic block diagrams illustrating embodiments of garbage collection. Blocks 105 are depicted with pages 110 as illustrated in FIG. 2.

Figure 4A:
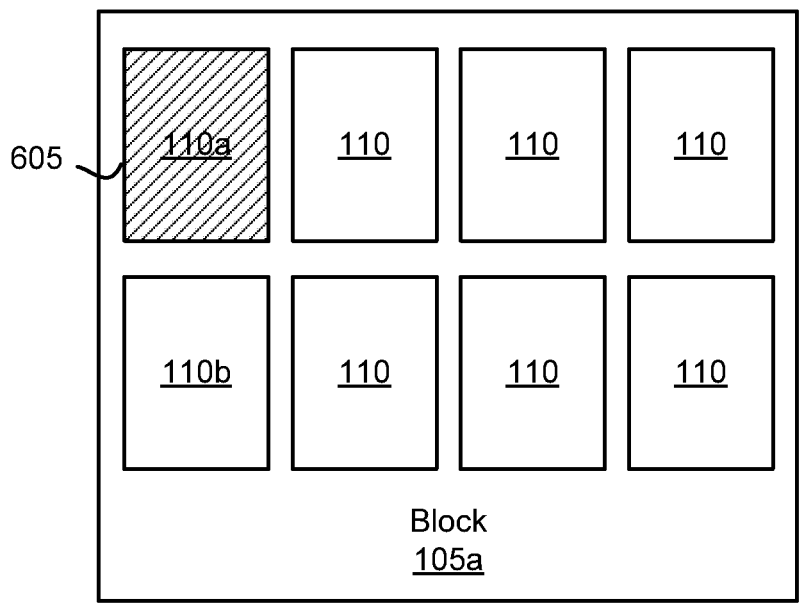
FIGS. 4A-D are schematic block diagrams illustrating embodiments of garbage collection.

FIG. 4A depicts writing data 605 to a first page 110a of the first block 105a. All the memory spaces of the first page 110a may be written to as part of the write. The physical location of the data 605 in the first page 110a may be recorded in a catalog.

Figure 4B:
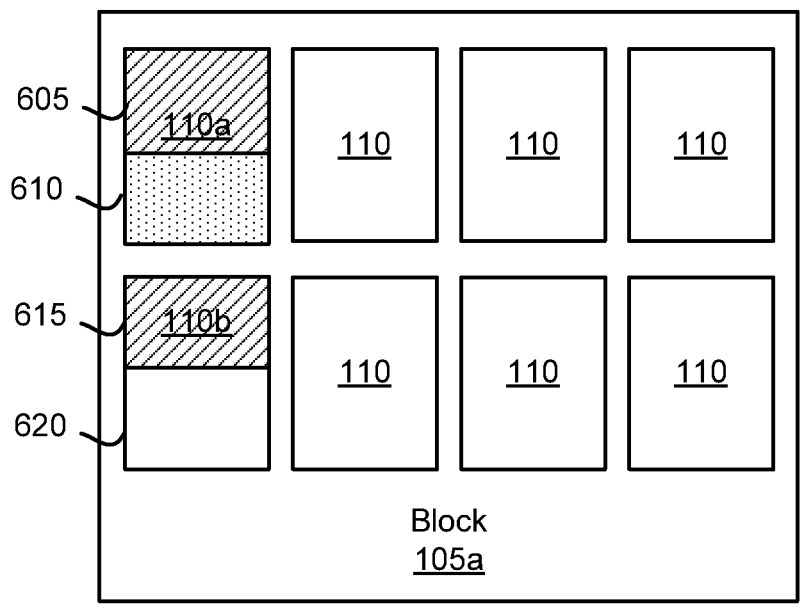

FIG. 4B depicts modifying a portion of the data 605 of FIG. 4A. Because the portion of the data 605 cannot be overwritten directly without overwriting all the memory spaces on the first page 110a, the portion 615 is instead written to a second page 110b. In addition, other data may be written with the portion 615 to the second page 110b, although for simplicity only the writing of the portion 615 is described. The catalog is updated to record the physical location of the portion 615. The memory spaces of the first page 110a that had stored the portion 610 no longer store valid data. The catalog may be updated to indicate that the portion 610 does not store valid data.

Figure 4C:
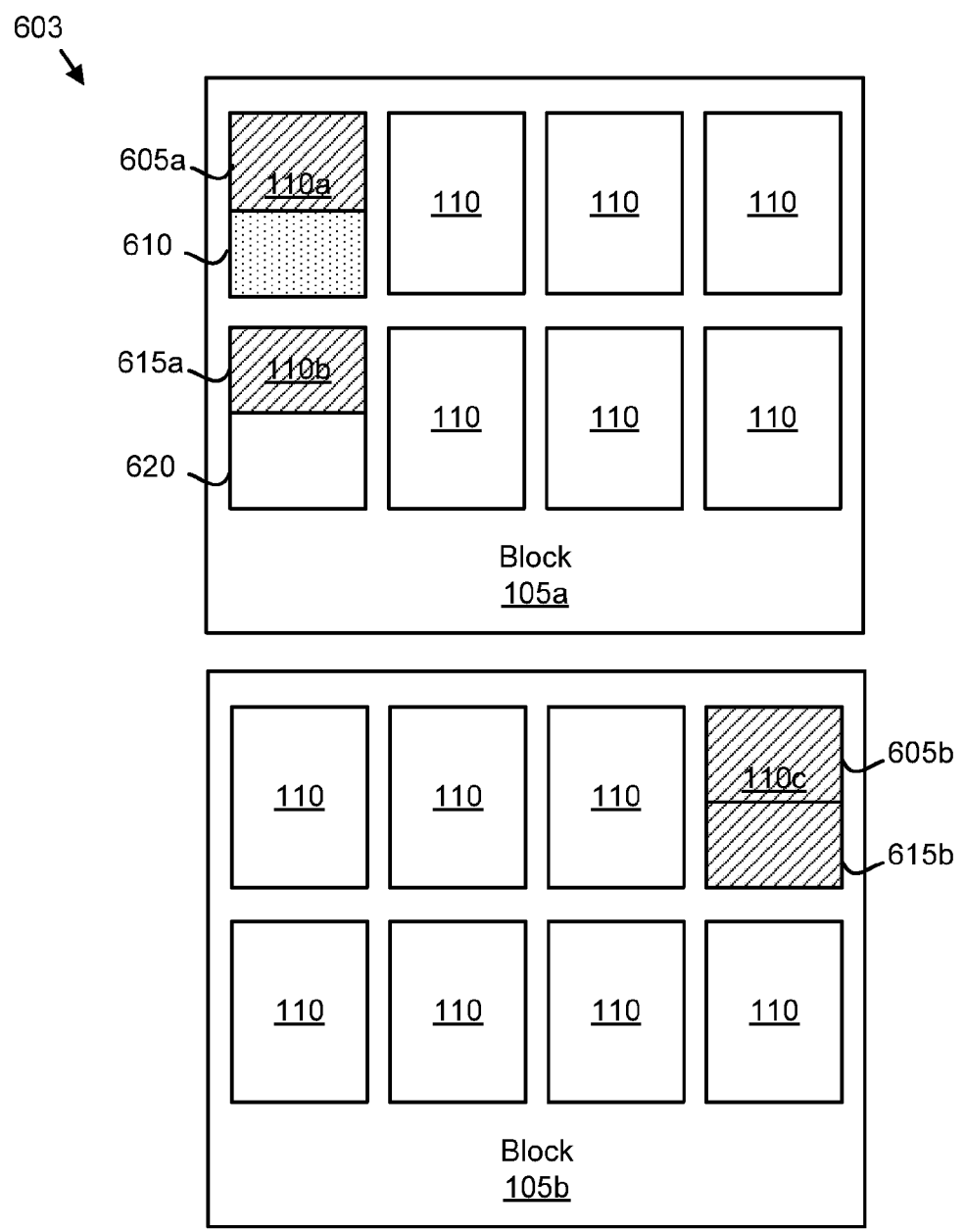

FIG. 4C depicts consolidating the data 605 and modified data 615 as part of garbage collection for the array 110. The original data 605a and the modified data 615a are copied to a third page 110c on a second block 105b. The catalog may be updated to indicate the physical location of the original data 605b and the modified data 615b on the third page 110c.

Figure 4D:
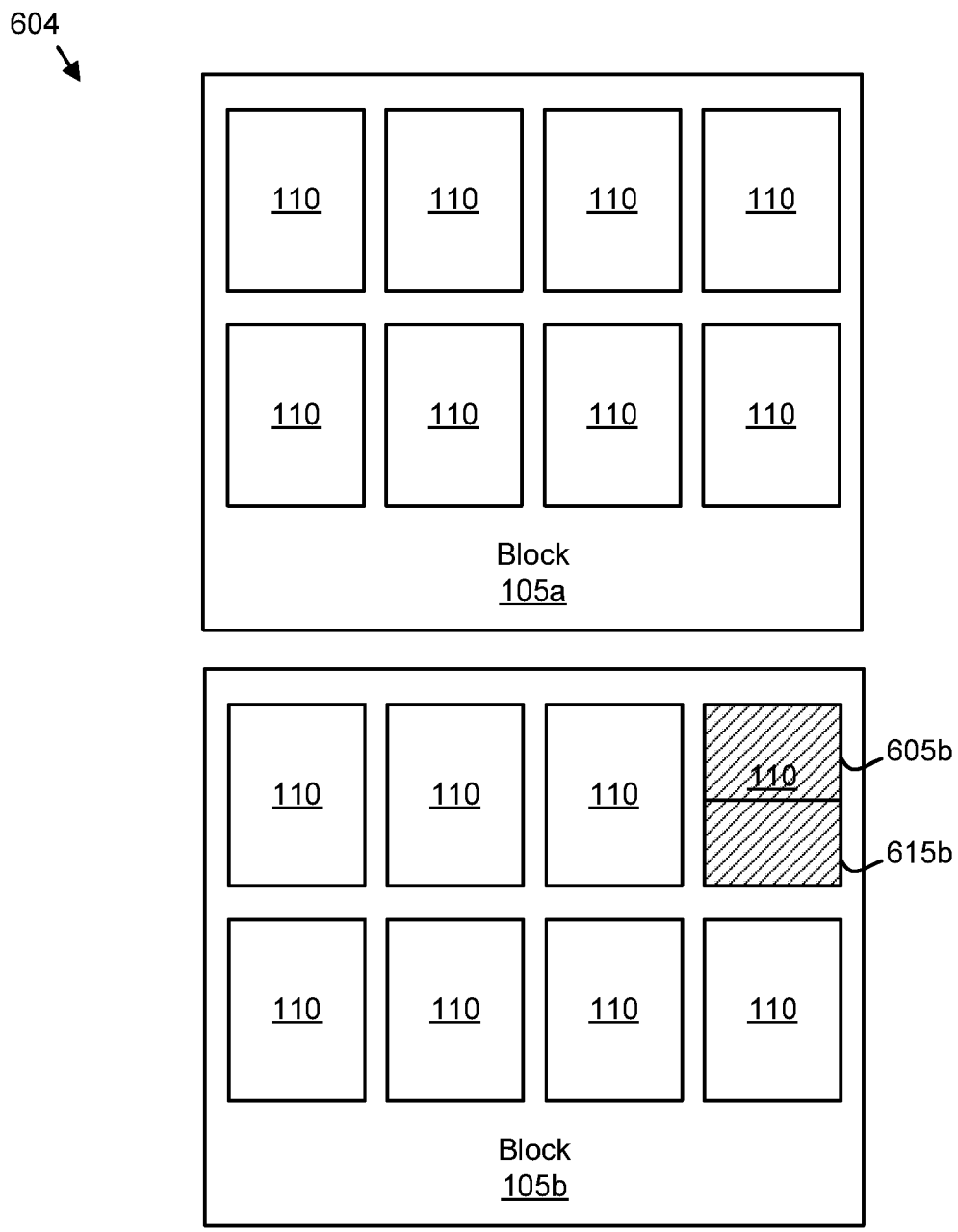

FIG. 4D depicts the completion of garbage collection with the erasure of the first block 105a. As a result, the original data 605b and the modified data 615b only occupy the third page 110c of the second block 105b. Thus the number of pages required to store the data 605b, 615b is reduced and the first and second pages 110a-b are free to store additional data.

Figures 5A, 5B:
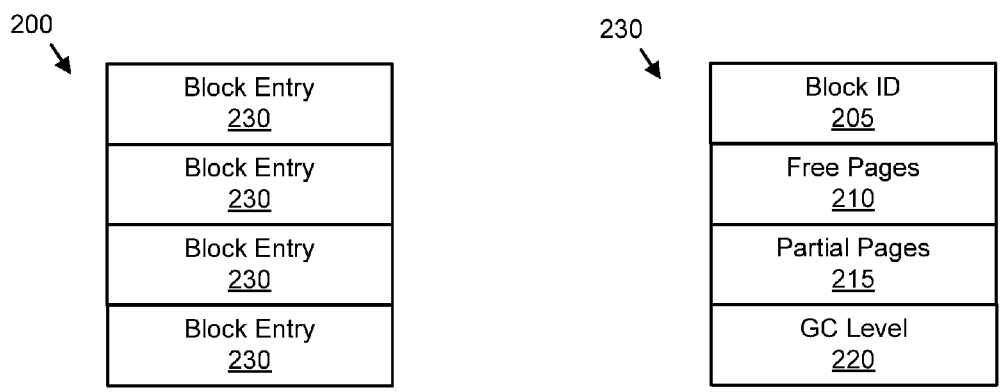
FIGS. 5A-B are schematic block diagrams illustrating embodiments of memory data.

FIGS. 5A-B are schematic block diagrams illustrating embodiments of memory data. The memory data includes a block list 200 as depicted in FIG. 5A. In one environment, the block list 200 includes a block entry 230 for each block 105 in the array 100. Alternatively, the block list 200 may include a block entry 230 for each block 105 that stores active data. The block list 200 may be embodied in a catalog.

The memory data also includes the block entries 230 as depicted in FIG. 5B. Each block entry 230 may include a block identifier 205, free pages 210, partial pages 215, and a garbage collection level 220. The block identifier 205 may uniquely identify a block 105 associated with the block entry 230.

Free pages 210 may list each free page 110 in the block 105. In addition, the free pages 210 may include a free pages number quantifying the number of free pages 110 in the block 105. Free pages may be pages 110 that do not store active data.

Partial pages 210 may list each page 110 in the block 105 that stores some active data. The partial pages may include a partial pages number. In one embodiment, a page 110 is a partial page if the page 110 stores less active data than a partial threshold. For example, the partial threshold may be 50% of the memory spaces storing active data.

The garbage collection level 220 may specify one of a critical level, a middle level, and a warning level. To the garbage collection level 220 may be determined from at least one of the free pages number and the partial pages number for each block 105. The garbage collection level 220 may be the critical level in response to at least one of the free pages number being less than a critical free pages threshold and the partial pages number being less than a critical partial pages threshold.

The garbage collection level may be the middle level in response to at least one of the free pages number being less than a middle free pages threshold and not less than the critical free pages threshold, and the partial pages number being less than a middle partial pages threshold and not less than the critical partial pages threshold. The garbage collection level may be the warning level in response to at least one of the free pages number being less than a warning free pages threshold and not less than the middle free pages number, and the partial pages number being less than a warning free pages threshold and not less than the middle free pages threshold.

In alternative embodiment, the garbage collection level 220 may be a numerical value. In one embodiment, the garbage collection level GCL 220 is calculated using Equation 1, where k and j are nonzero constants, P is the partial pages number, and F is the free pages number.

$$GCL = kP - jF \qquad \text{Equation 1}$$

Figure 6A:
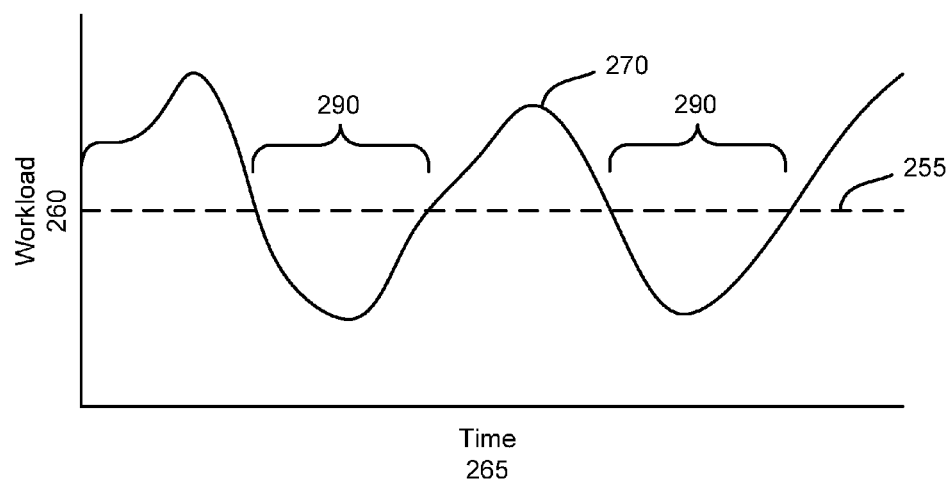
FIGS. 6A-B are a graphs illustrating embodiments of workload thresholds.
Figure 6B:
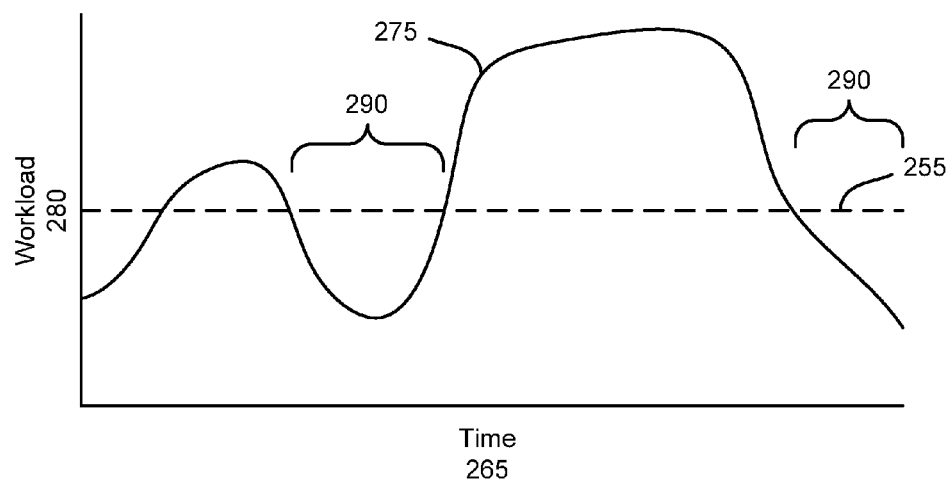

FIGS. 6A-B are graphs illustrating embodiments of workload thresholds 255. FIG. 6A depicts workloads 260 for a storage device such as the SSD 140. In one embodiment, the workload 260 is a number of accesses to the storage device. Alternatively, the workload 260 may be a quantity of data transferred to and from the storage device such as 50 Megabytes (MB) per second. The workload 260 varies over time 265. The workload threshold 255 specifies a workload such as 500 accesses to the storage device per second. A garbage collection time window 290 may be identified when the workload 260 is less than the work threshold 255. The garbage collection window 290 may be referred to as an open garbage collection window 290 during the time 265 when the workload 260 is less than the workload threshold 255.

FIG. 6B depicts workloads 280 for a block 105. The workload 280 may be a number of accesses to the block 105, a quantity of data transferred to and from the block 105, and the like. The workload threshold 255 specifies a workload 280 such as five accesses to the block 105 per second. The garbage collection time window 290 may be identified when the workload 280 is less than the work threshold 255. The garbage collection window 290 may be referred to as an open garbage collection window 290 during the time 265 when the workload 280 is less than the workload threshold 255.

Figure 7:
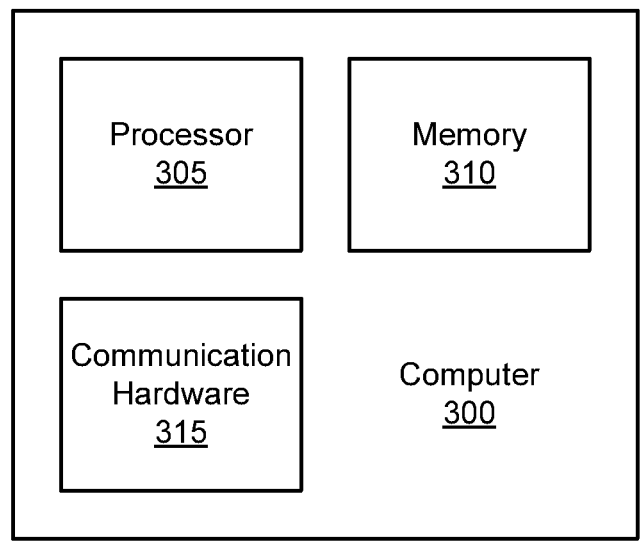
FIG. 7 is a schematic block diagram illustrating one embodiment of a computer.

FIG. 7 is a schematic block diagram illustrating one embodiment of a computer 300. The computer 300 may be embodied in the controller 135. Alternatively, the computer 300 may be embodied in the SSD 140. In one embodiment, the computer 300 is embodied in the server 130, the controller 135, the SSD 140, or combinations thereof.

The computer 300 includes a processor 305, a memory 310, and communication hardware 315. The memory 310 may be a computer readable storage medium. The memory 310 may be a semiconductor storage device, a hard disk drive, an optical storage device, a micromechanical storage device, or combinations thereof. The memory 310 may store program code. The program code may be readable/executable by the processor 305. The communication hardware 315 may communicate with other devices.

Figure 8:
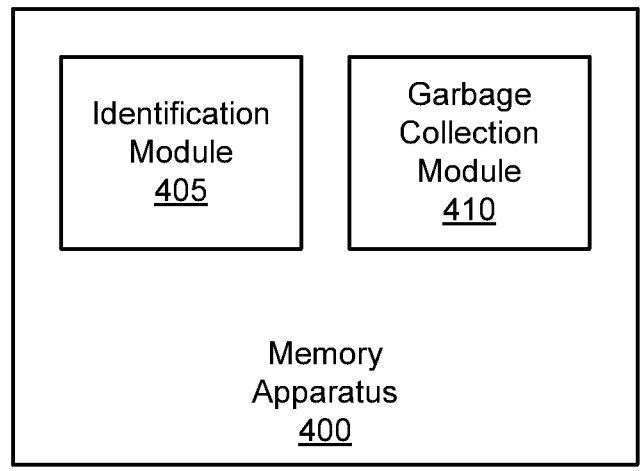
FIG. 8 is a schematic block diagram illustrating one embodiment of a memory apparatus.

FIG. 8 is a schematic block diagram illustrating one embodiment of a memory apparatus 400. The apparatus 400 may be embodied in the computer 300. The apparatus 400 includes an identification module 405 and the garbage collection module 410. At least a portion of the identification module 405 and the garbage collection module 410 may comprise one or more of hardware and program code. The hardware may be semiconductor gates, discrete components, and combinations thereof. The program code may be stored on one or more computer readable storage media such as the memory 310.

The identification module 405 may identify the garbage collection time window for at least one block 105 of the flash memory array 100. The garbage collection module 410 may garbage collect a first block 105a of the flash memory array 100 with a highest garbage collection level and an open garbage collection time window as will be described hereafter.

Figure 9:
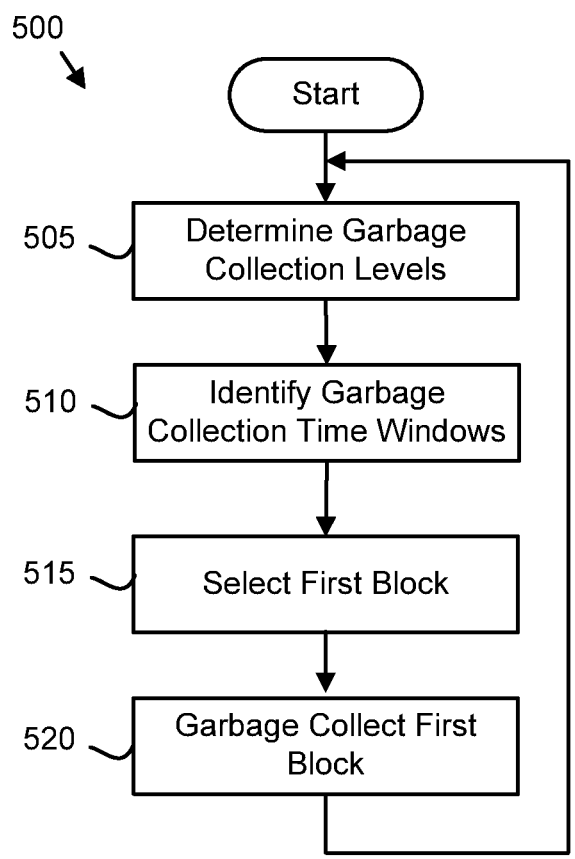
FIG. 9 is a schematic flow chart diagram illustrating one embodiment of a semiconductor memory garbage collection method.

FIG. 9 is a schematic flow chart diagram illustrating one embodiment of a semiconductor memory garbage collection method 500. The method 500 may perform the functions of the system 150 and apparatus 400. The method 500 may be performed by the processor 305. Alternatively, the method 500 may be performed by a computer program product. The computer program product may comprise a computer readable storage medium such as the memory 310. The computer readable storage medium may have program code embedded thereon. The program code may be readable/executable by the processor 305 to perform the functions of the method 500.

The method 500 starts, and in one embodiment, the identification module 405 determines 505 a garbage collection level 220 for least one block 105 of the flash memory array 100. In one embodiment, the garbage collection levels 220 is determined from at least one of the free pages number and the partial pages number for each block 105. Alternatively, the garbage collection level 220 may be calculated using Equation 1.

In one embodiment, the identification module 405 determines 505 garbage collection levels 220 after a specified time interval such as 60 seconds. Alternatively, the identification module 405 may determine 505 the garbage collection levels continuously. In a certain embodiment, the identification module 405 determines 505 the garbage collection levels 220 after a specified number of accesses to the array 100, a transfer of a specified quantity of data to the array 100, or the like.

The identification module 405 identifies 510 a garbage collection time window 290 for at least one block 105 of the flash memory array 100. The garbage collection time window 290 may be identified when a storage device workload 260 is less than a work threshold 255. Alternatively, the garbage collection time window 290 may be identified in response to a block workload 280 being less than the work threshold 255. In one embodiment, the identification module 405 forecasts the garbage collection time window 290 from a change in workload 260, 280.

The garbage collection module 410 may select 515 a first block 105a for garbage collection. In one embodiment, the garbage collection module 410 selects 515 a block 105 with a highest garbage collection level 220 and an open garbage collection time window 290. In a certain embodiment, the critical level is higher than the middle level and the middle level is higher than the warning level. Thus a block 105 with the critical level is selected over a block 105 with the middle level. In a certain embodiment, the block 105 with a highest garbage collection value is selected.

The garbage collection module 410 may further garbage collect 520 the first block 105a. In one embodiment, the garbage collection module 410 employs the garbage collection process described in FIGS. 4A-D. The method 500 may further loop to determine 505 garbage collection levels 220.

By performing garbage collection 520 on a block 105 with the highest garbage collection level 220 and an open garbage collection time window 290, the method 500 performs timely garbage collection while minimizing the effect of the garbage collection on input and output operations to an SSD 140. Blocks 105 that have less need of garbage collection are not selected for garbage collection. Similarly, blocks 105 that are actively employed are also not selected for garbage collection.

Figure 10:
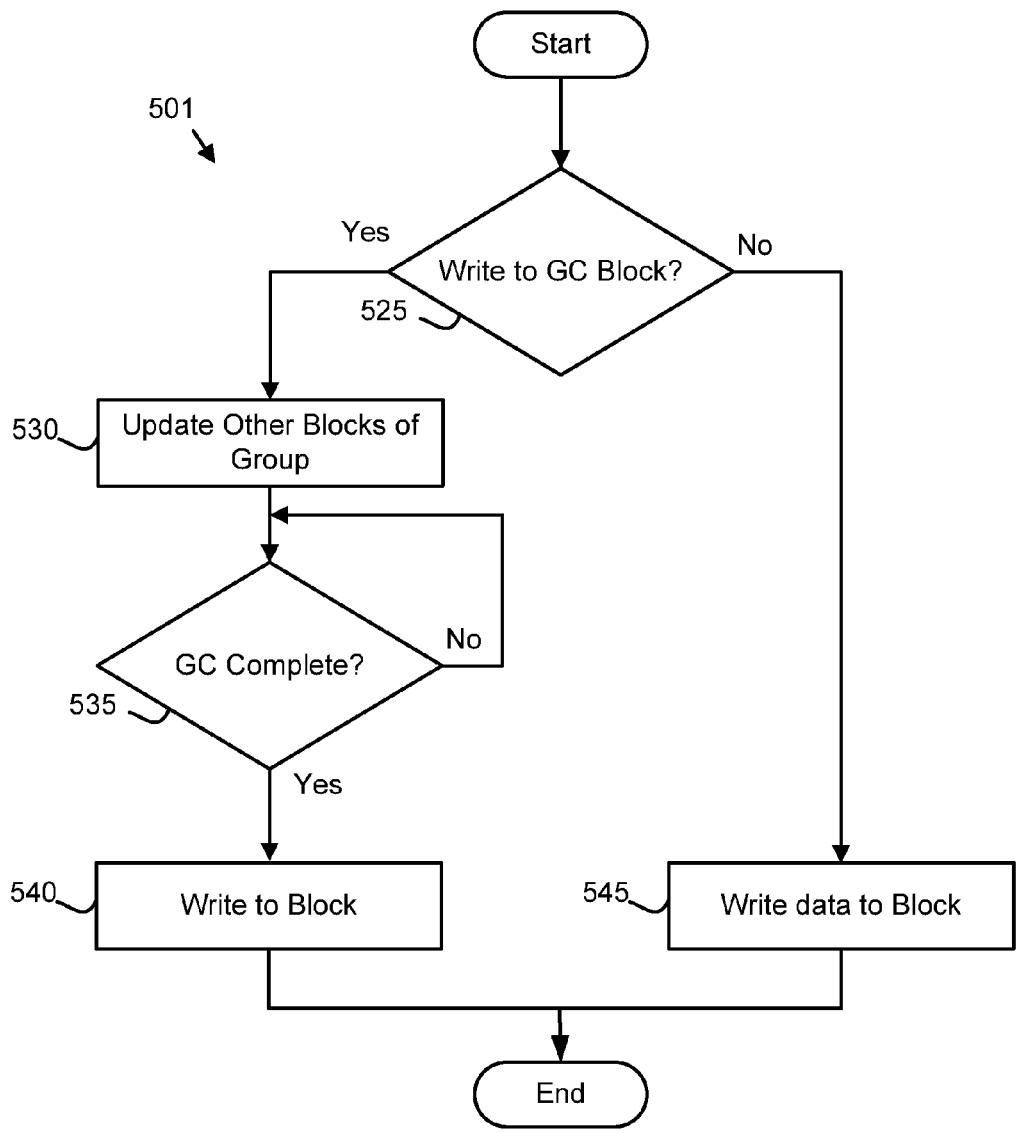
FIG. 10 is a schematic flow chart diagram illustrating one embodiment of a component-in-doubt method.

FIG. 10 is a schematic flow chart diagram illustrating one embodiment of a component-in-doubt method 501. The method 501 may perform the functions of the system 150 and apparatus 400. The method 501 may be performed by the processor 305. Alternatively, the method 501 may be performed by a computer program product. The computer program product may comprise a computer readable storage medium such as the memory 310. The computer readable storage medium may have program code embedded thereon. The program code may be readable/executable by the processor 305 to perform the functions of the method 501.

The method 501 starts, and in one embodiment, the garbage collection module 410 determines 525 if a write is to a first block 105a that is undergoing garbage collection. The data for the first block 105a may be stored redundantly. The data may be stored redundantly in other blocks 105 of a group. In one embodiment, the data for the block 105 is mirrored to a second block 105b. Alternatively, the data for the block 105 is stored using a redundancy method such as redundant array of independent disk (RAID) type redundancy as will be illustrated in FIG. 12A.

If the first block 105a is not undergoing garbage collection, the controller 135 and/or SSD 140 may write 545 data to the first block 105a and the method 501 ends. If the first block 105a is undergoing garbage collection, the garbage collection module 410 updates 530 the other blocks 105 of the group with redundant data from the write. Upon updating 530 the other blocks 105 of the group with the redundant data from the write, the garbage collection module 410 may change a status of the write to complete. Thus a host, an application and/or operating system does not continue to wait for the write to complete. For example, if RAID type redundancy is used, the data may be written to stripes of other blocks 105 redundantly storing data with the first block 105a and a parity stripe may be calculated and written to a parity block 105. Thus the data is available in the array 100, although the data has not yet been written to the first block 105a. In addition, the host, application, and/or operating system is not waiting for the write to complete.

In one embodiment, the garbage collection module 410 may record a component-in-doubt status. The component-in-doubt status may be a write-in-process status and may indicate that the data has not been written to the first block 105a, although the status of the write is a completed write. The component-in-doubt status may be stored in non-volatile memory.

The garbage collection module 410 may determine 535 if garbage collection is complete for the first block 105a. If garbage collection is not complete, the garbage collection module 410 continues to determine 535 if garbage collection is complete for the first block 105a. If the garbage collection is complete, the garbage collection module 410 writes 540 the data to the first block 105a and the method 501 ends. In one embodiment, the garbage collection module 410 may set the component-in-doubt status to complete. The component-in-doubt status may be set to complete by clearing the component-in-doubt status record.

The method 501 supports writing data to a block 105 even when the block 105 is undergoing garbage collection. As a result, the impact of the garbage collection operation on other transactions is reduced.

Figure 11:
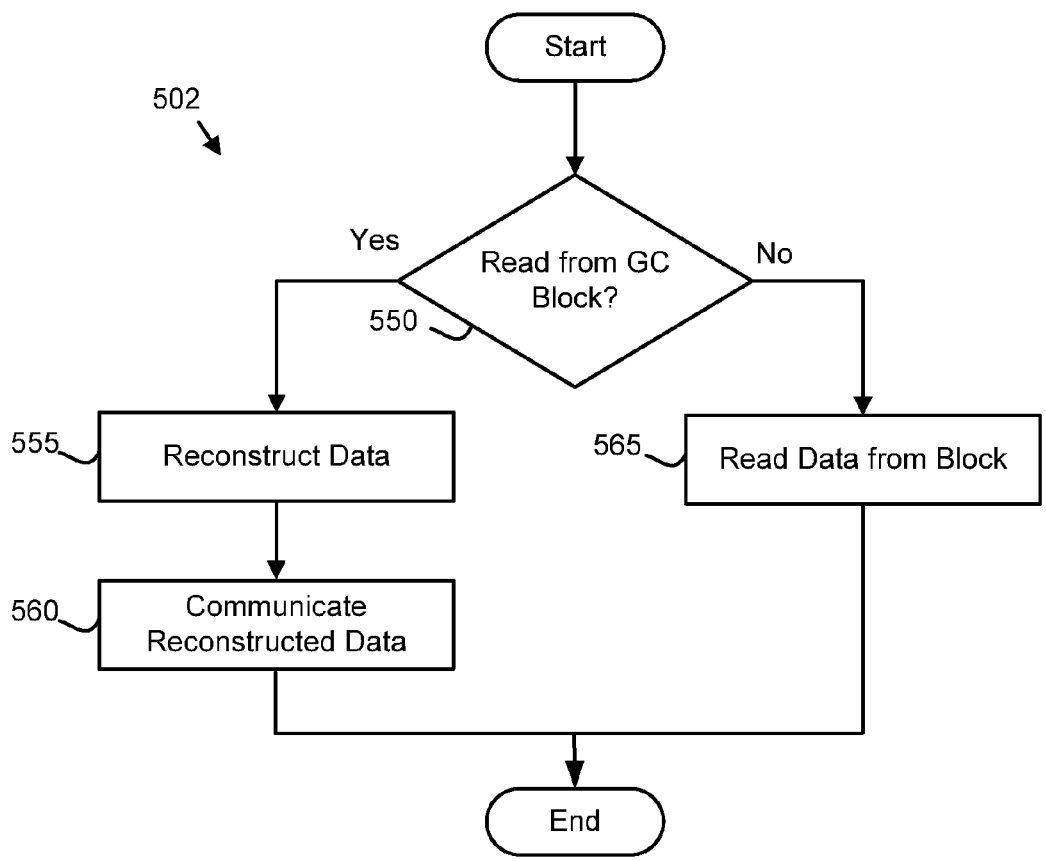
FIG. 11 is a schematic flow chart diagram illustrating one embodiment of a preemptive reconstruction method.

FIG. 11 is a schematic flow chart diagram illustrating one embodiment of a preemptive reconstruction method 502. The method 502 may be performed by the processor 305. Alternatively, the method 502 may be performed by a computer program product. The computer program product may comprise a computer readable storage medium such as the memory 310. The computer readable storage medium may have program code embedded thereon. The program code may be readable/executable by the processor 305 to perform the functions of the method 502.

The method 502 starts, and in one embodiment the garbage collection module 410 determines 550 if a read operation is from a first block 105a that is undergoing garbage collection. The data for the first block 105a may be stored redundantly. The data may be stored redundantly in other blocks 105 of a group. In one embodiment, the data for the block 105 is mirrored to a second block 105b. Alternatively, the data for the block 105 is stored using a redundancy method such as RAID type redundancy.

If the first block 105a is not undergoing garbage collection, the controller 135 and/or SSD 140 may read 565 data from the first block 105a and the method 502 ends. If the first block 105a is undergoing garbage collection, the garbage collection module 410 may reconstruct 555 the data of the first block 105a from at least one other block 105 redundantly storing the data. For example, if RAID type redundancy is used, the data stored in stripes and a parity stripes on other blocks 105 in the group may be used to reconstruct 555 the data. Thus the data is available from the array 100, although, the first block 105a cannot be read.

The garbage collection module 410 may further communicate 560 the reconstructed data and the method 502 ends. The method 502 supports reading from a block 105 while the block 105 is undergoing garbage collection. As a result, the impact of the garbage collection operation on other transactions is reduced.

Figure 12A:
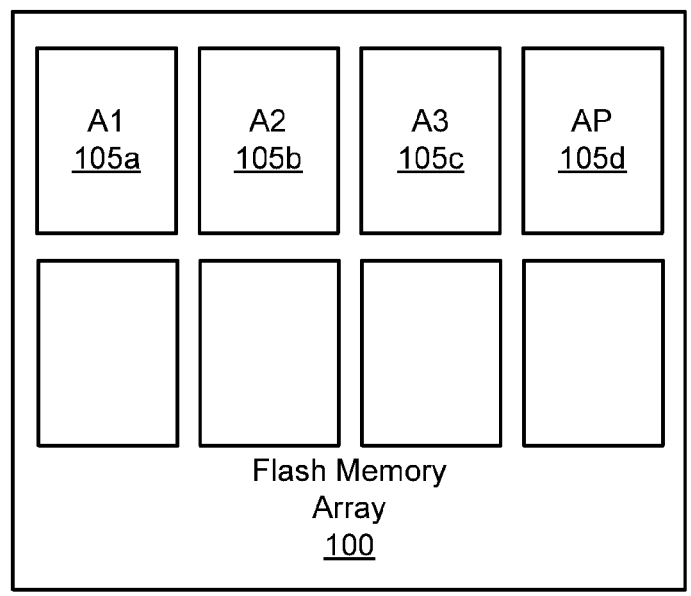
FIGS. 12A-C are schematic block diagrams illustrating embodiments of redundant data.
Figure 12B:
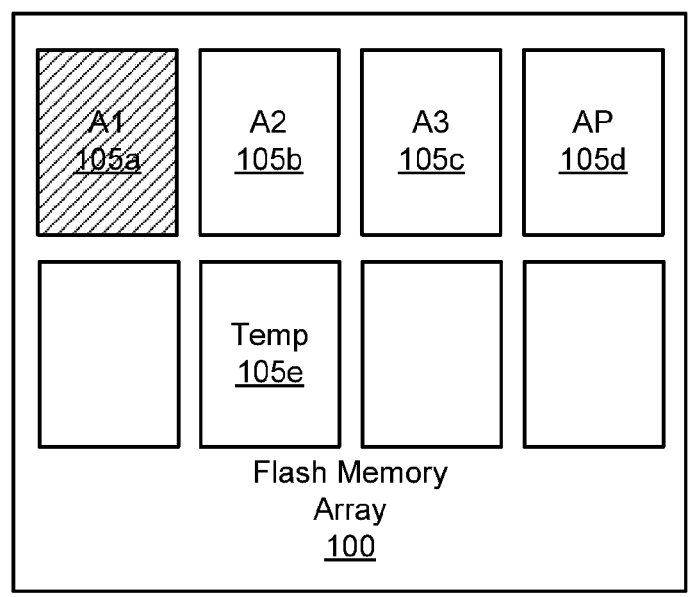
Figure 12C:
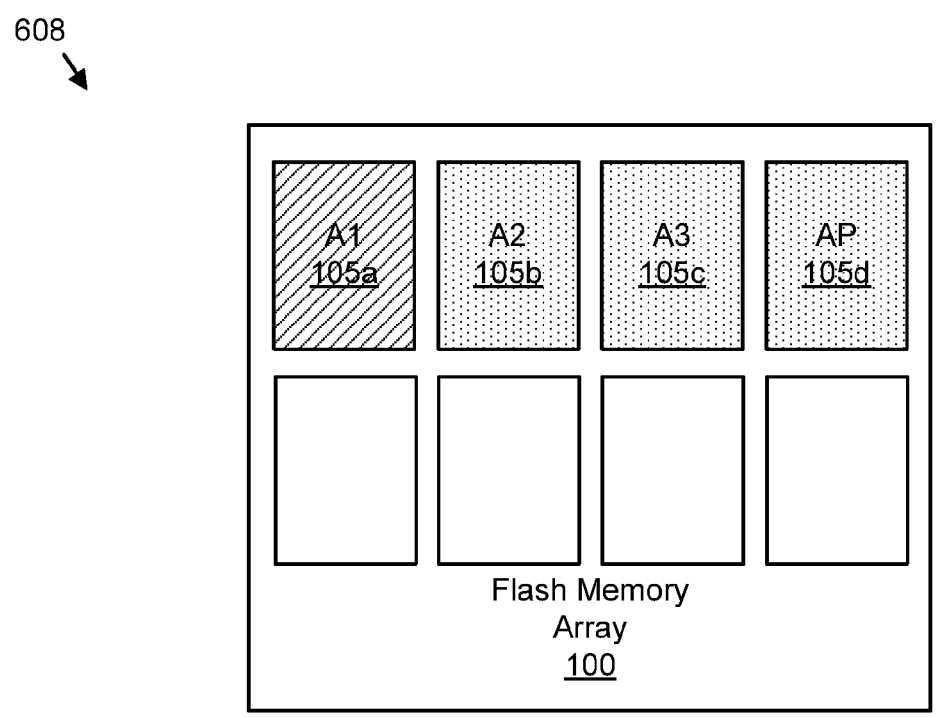

FIGS. 12A-C are schematic block diagrams illustrating embodiments of redundant data. FIG. 12A depicts a flash memory array 100 with four blocks 105a-d organized as group with RAID 5 redundancy. Stripes A1-3 105a-c may store data while a parity stripe AP 105d stores parity information. As a result, data may be reconstructed from any three of the blocks 105a-d.

FIG. 12B illustrates one embodiment of the preemptive reconstruction method 502 of FIG. 11. The stripes A1-P 105a-d of FIG. 12A are shown. A first stripe block 105a is undergoing garbage collection as indicated by the crosshatching. As a result, data stored in the first stripe block 105a may be reconstructed from blocks A2-AP 105b-d and communicated in response to the read. The data may be stored to a temporary block 105e and read from the temporary block 105e.

FIG. 12C depicts one embodiment of the component-in-doubt method 501 of FIG. 10. The stripes A1-P 105a-d of FIG. 12A are shown. A first stripe block 105a is undergoing garbage collection as indicated by crosshatching. As a result, data for a write to the first stripe block 105a is redundantly stored to the other stripe blocks A2-P 105b-d as indicated by the shading. The data for the write is therefore available on the array 100 before the garbage collection operation on the first block 105a is complete. The status of the write may be set to complete, indicating to a host, an application, and/or an operating system that the write is complete. In addition, the garbage collection module 410 may set the component-in-doubt status to write-in-process to indicate that the write of data to the first stripe block 105a is in process. When garbage collection is complete for the first stripe block 105a, the data is also written to the first stripe block 105a. In addition, the garbage collection module 410 may set the component-in-doubt status to complete.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an identification module that identifies a garbage collection time window for at least one block of a flash memory array and determines a garbage collection level for the at least one block, wherein the garbage collection level is determined from at least one of a free pages number and a partial pages number for each block;
   a garbage collection module garbage that collects a first block of the flash memory array with a highest garbage collection level and an open garbage collection time window; and
   wherein at least a portion of the identification module and the garbage collection module comprise one or more of hardware and program code, the program code stored on one or more computer readable storage media.

2. The apparatus of claim 1, wherein the garbage collection level is a critical level in response to at least one of the free pages number being less than a critical free pages threshold and the partial pages number being less than a critical partial pages threshold, the garbage collection level is a middle level in response to at least one of the free pages number being less than a middle free pages threshold and not less than the critical free pages threshold, and the partial pages number being less than a middle partial pages threshold and not less than the critical partial pages threshold, and the garbage collection level is a warning level in response to at least one of the free pages number being less than a warning free pages threshold and not less than the middle free pages number, and the partial pages number being less than a warning free pages threshold and not less than the middle free pages threshold.

3. The apparatus of claim 1, wherein the garbage collection time window is identified in response to at least one of a storage device workload being less than a work threshold and a block workload being less than the work threshold.

4. The apparatus of claim 1, wherein data of the first block is stored redundantly and the garbage collection module further:
   updates at least one other block with redundant data from a write request directed to the first block in response to receiving the write request during the garbage collection for the first block;

indicates that the write request is complete; and writes data from the write request to the first block in response to completing the garbage collection.

5. The apparatus of claim 1, wherein data of the first block is stored redundantly and the garbage collection module further:

reconstructs the data of the first block from at least one other block in response to receiving a read directed to the first block during the garbage collection for the first block; and communicates the reconstructed data in response to the read.

6. The method of claim 1, wherein the memory array is Negated AND or NOT AND (NAND) Flash memory array.

7. A method for semiconductor memory garbage collection comprising:

identifying, by use of a processor, a garbage collection time window for at least one block of a flash memory array;

determining a garbage collection level for the at least one block, wherein the garbage collection level is determined from at least one of a free pages number and a partial pages number for each block; and garbage collecting a first block of the flash memory array with a highest garbage collection level and an open garbage collection time window.

8. The method of claim 7, wherein the garbage collection level is a critical level in response to at least one of the free pages number being less than a critical free pages threshold and the partial pages number being less than a critical partial pages threshold, the garbage collection level is a middle level in response to at least one of the free pages number being less than a middle free pages threshold and not less than the critical free pages threshold, and the partial pages number being less than a middle partial pages threshold and not less than the critical partial pages threshold, and the garbage collection level is a warning level in response to at least one of the free pages number being less than a warning free pages threshold and not less than the middle free pages number, and the partial pages number being less than a warning free pages threshold and not less than the middle free pages threshold.

9. The method of claim 7, wherein the garbage collection time window is identified in response to a storage device workload being less than a work threshold.

10. The method of claim 7, wherein the garbage collection time window is identified in response to a block workload being less than a work threshold.

11. The method of claim 7, wherein data of the first block is stored redundantly and further comprising:

updating at least one other block with redundant data from a write request directed to the first block in response to receiving the write request during the garbage collection for the first block;

indicating that the write request complete; and writing data from the write request to the first block in response to completing the garbage collection.

12. The method of claim 7, wherein data of the first block is stored redundantly and further comprising:

reconstructing the data of the first block from at least one other block in response to receiving a read directed to the first block during the garbage collection for the first block; and communicating the reconstructed data in response to the read.

13. A computer program product for semiconductor memory garbage collection, the computer program product comprising a non-transitory computer readable storage medium having program code embodied therein, the program code readable/executable by a processor to:

identifying a garbage collection time window for at least one block of a flash memory array;

determining a garbage collection level for the at least one block, wherein the garbage collection level is determined from at least one of a free pages number and a partial pages number for each block; and garbage collecting a first block of the flash memory array with a highest garbage collection level and an open garbage collection time window.

14. The computer program product of claim 13, wherein the garbage collection level is a critical level in response to at least one of the free pages number being less than a critical free pages threshold and the partial pages number being less than a critical partial pages threshold, the garbage collection level is a middle level in response to at least one of the free pages number being less than a middle free pages threshold and not less than the critical free pages threshold, and the partial pages number being less than a middle partial pages threshold and not less than the critical partial pages threshold, and the garbage collection level is a warning level in response to at least one of the free pages number being less than a warning free pages threshold and not less than the middle free pages number, and the partial pages number being less than a warning free pages threshold and not less than the middle free pages threshold.

* * * * *